(12) United States Patent
Ishikawa

(10) Patent No.: US 9,728,954 B2
(45) Date of Patent: Aug. 8, 2017

(54) PROTECTION CIRCUIT FOR ROBOT CONTROL DEVICE

(71) Applicant: Mitsubishi Electric Corporation, Tokyo (JP)

(72) Inventor: Takafumi Ishikawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/038,153

(22) PCT Filed: Nov. 21, 2013

(86) PCT No.: PCT/JP2013/081430
§ 371 (c)(1),
(2) Date: May 20, 2016

(87) PCT Pub. No.: WO2015/075801
PCT Pub. Date: May 28, 2015

(65) Prior Publication Data
US 2016/0285254 A1    Sep. 29, 2016

(51) Int. Cl.
*H02H 7/20* (2006.01)
*H02H 3/08* (2006.01)
(Continued)

(52) U.S. Cl.
CPC .......... *H02H 7/20* (2013.01); *B25J 19/06* (2013.01); *H02H 3/08* (2013.01); *H02H 3/20* (2013.01); *H02H 3/38* (2013.01); *H02J 1/00* (2013.01)

(58) Field of Classification Search
CPC .. H02H 1/00; H02H 3/20; H02H 3/28; H02H 7/20; B25J 19/06
See application file for complete search history.

(56) References Cited

U.S. PATENT DOCUMENTS 5,184,109 A * 2/1993 Tanaka ............. H02J 7/1461
340/438
5,408,379 A  4/1995 Oguchi et al.
(Continued)

FOREIGN PATENT DOCUMENTS

JP    2-179219 A    7/1990
JP    2-125530 U    10/1990
(Continued)

OTHER PUBLICATIONS

Japanese Notice of Rejection for JP 2014-520450 dated Jul. 25, 2014.
(Continued)

*Primary Examiner* — Thienvu Tran
*Assistant Examiner* — Tien Mai
(74) *Attorney, Agent, or Firm* — Sughrue Mion, PLLC; Richard C. Turner

(57) ABSTRACT

A first current cut-off unit that cuts off a current input from a power-supply-voltage input terminal connected to an AC power source when a current value of the current exceeds a preset threshold, and a second current cut-off unit that cuts off a current output from the first current cut-off unit when a voltage value of a voltage applied from the power-supply-voltage input terminal exceeds a preset threshold are configured. A current cut-off element provided on a current path from the power-supply-voltage input terminal toward a DC output terminal, and a resistor that draws a current having passed through the current cut-off element toward a ground are provided as the first current cut-off unit.

9 Claims, 2 Drawing Sheets

(51) Int. Cl.
*H02H 3/20* (2006.01)
*B25J 19/06* (2006.01)
*H02J 1/00* (2006.01)
*H02H 3/38* (2006.01)

(56) References Cited

U.S. PATENT DOCUMENTS

| | | | | |
|---|---|---|---|---|
| 6,088,207 | A * | 7/2000 | Sugiura | H03K 17/0826 307/10.8 |
| 6,510,032 | B1 | 1/2003 | Whitney | |
| 2004/0156160 | A1* | 8/2004 | Choo | H02H 7/1252 361/118 |
| 2011/0101787 | A1* | 5/2011 | Gaul | H01L 31/02021 307/85 |

FOREIGN PATENT DOCUMENTS

| | | | |
|---|---|---|---|
| JP | 5-68337 | A | 3/1993 |
| JP | 2003-530053 | A | 10/2003 |
| JP | 2004-88857 | A | 3/2004 |
| JP | 2007-43822 | A | 2/2007 |
| JP | 2010-263734 | A | 11/2010 |
| WO | 01/75910 | A1 | 10/2001 |

OTHER PUBLICATIONS

Japanese Notice of Allowance for JP 2014-520450 dated Dec. 8, 2014.
International Search Report for PCT/JP2013/081430 dated Feb. 10, 2014.

* cited by examiner

PROTECTION CIRCUIT FOR ROBOT CONTROL DEVICE

CROSS REFERENCE TO RELATED APPLICATIONS

This application is a National Stage of International Application No. PCT/JP2013/081430 filed Nov. 21, 2013, the contents of which are incorporated herein by reference in their entirety.

FIELD

The present invention relates to a protection circuit for a robot control device.

BACKGROUND

A robot control device for controlling a robot is required to comply with various safety standards. A countermeasure against overvoltage failures of an input power source is one of the requirements.

Conventionally, as an overvoltage protection countermeasure applied to a power-supply circuit for complying with the safety standards, one of following methods is adopted:

(1) A power-supply product with a safety certification acquired from a third-party organization is used; and (2) A power-supply product with no safety certification acquired from a third-party is adopted and an overvoltage protection function is added to the power-supply product later.

Out of the above methods, the method (1) is easy as a measure for achieving the overvoltage protection countermeasure. However, the method (1) has problems such as a purchase price is significantly higher than the power-supply product with no safety certification acquired from the third party.

Meanwhile, the method (2) can be achieved fairly less expensively as compared with the method (1). Therefore, generally, it is more likely to apply the method (2) to achieve compliance with the safety standard.

As a measure for achieving the overvoltage protection countermeasure, Patent Literature 1 listed below describes an overvoltage protection circuit in which, when an excessively large voltage is input by mistake, a surge absorber breaks in a short-circuit mode to surely cause melting of a fuse, for example.

Further, Patent Literature 2 listed below describes an overvoltage protection circuit in which, when an input voltage reaches a predetermined value or more, the input voltage exceeds a Zener voltage of a Zener diode and the Zener diode becomes electrically conductive, so that a thyristor is short-circuited and an overcurrent flows through a current fuse, causing the current fuse to be an open state (to melt).

CITATION LIST

Patent Literatures

Patent Literature 1: Japanese Patent Application Laid-open No. 2010-263734

Patent Literature 2: Japanese Patent Application Laid-open No. H2-179219

SUMMARY

Technical Problem

However, addition of the overvoltage protection function tends to result in an excessive achieving measure, because it is extremely strictly evaluated in safety certification whether the overvoltage protection function normally works or the safety is ensured in the product even when a failure of a component or the like occurs, for example.

Further, in the techniques disclosed in Patent Literatures 1 and 2, in a case where the surge absorber or the Zener diode fails in an open state, the fuse does not melt even when an overvoltage is input.

The present invention has been achieved in view of the above problems, and an object of the present invention is to provide a protection circuit for a robot control device with a simple circuit configuration while ensuring a sufficient level of safety for achieving compliance with safety certification.

Solution to Problem

To solve the above described problem and achieve the object, a protection circuit for a robot control device according to the present invention includes: a power-supply-voltage input terminal connected to an external power source; a first current cut-off unit that is connected to the power-supply-voltage input terminal and that cuts off a current input from the power-supply-voltage input terminal when a current value of the current exceeds a preset threshold; a second current cut-off unit that is provided at a subsequent stage of the first current cut-off unit and that cuts off a current output from the first current cut-off unit when a voltage value of a voltage applied from the power-supply-voltage input terminal exceeds a preset threshold; and a DC output terminal to which a DC current is output from the second current cut-off unit. The first current cut-off unit includes: a current cut-off element provided on a current path between the power-supply-voltage input terminal and the DC output terminal; and a resistor that draws a current having passed through the current cut-off element into a ground.

Advantageous Effects of Invention

According to the present invention, a protection circuit for a robot control device can be provided with a simple circuit configuration while a sufficient level of safety for achieving compliance with safety certification is ensured.

DESCRIPTION OF EMBODIMENTS

Exemplary embodiments of a protection circuit of a robot control device according to the present invention will be explained below in detail with reference to the accompanying drawings. The present invention is not limited to the embodiments.

Embodiment

Figure 1:
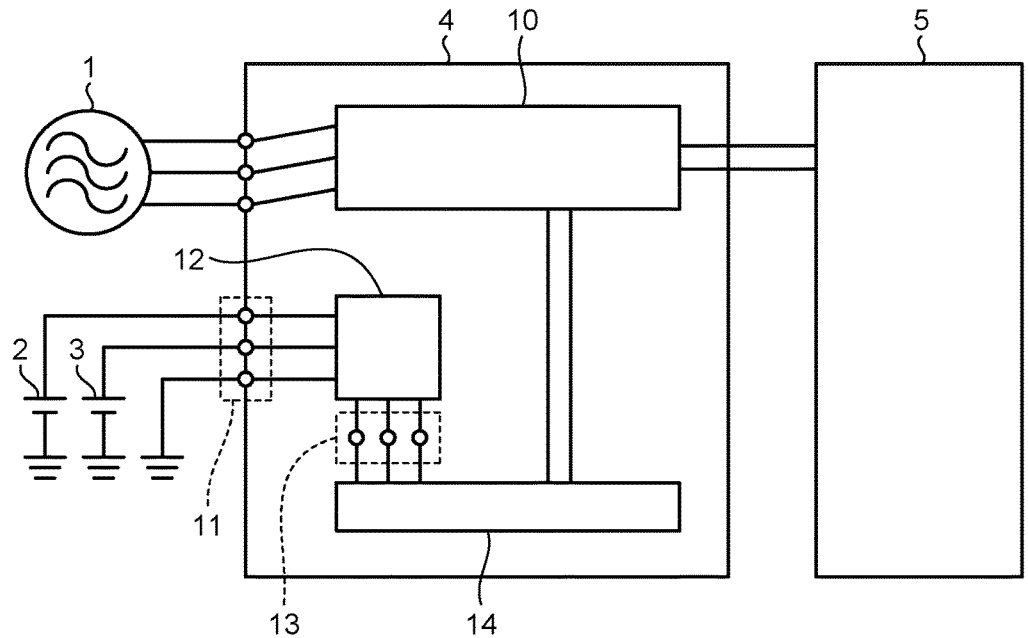
FIG. 1 is a diagram illustrating a schematic configuration of a robot control device according to an embodiment of the present invention.

FIG. 1 is a diagram illustrating a schematic configuration of a robot control device according to an embodiment of the present invention. An AC current is input from an AC power source 1 located outside a control device 4. By using power supplied from the AC power source 1, an AC current for driving a robot 5 that is a load of the control device 4 is generated by a power-conversion circuit portion 10 in the control device 4. The generated AC current is input to the robot 5. Meanwhile, DC currents from DC power sources 2 and 3 located outside the control device 4 are input through a respective power-supply-voltage input terminal 11, and drive a control circuit in a control circuit 14 in the control device 4.

An overvoltage-protection circuit 12 constituting a protection circuit of the robot control device according to the present embodiment is disposed between the DC power sources 2 and 3 and the control circuit 14. In a case where a voltage value of a voltage applied from the DC power source 2 or 3 exceeds a preset threshold (for example, in a case where an overvoltage state occurs) for some reason, the overvoltage-protection circuit 12 cuts off the current input from the DC power source 2 or 3 so that said current is not output to the control circuit 14 via a DC output terminal 13, in order to prevent components in the control circuit 14 from being broken. Further, in a case where a current value of the current input from the DC power source 2 or 3 exceeds a preset threshold (for example, in a case where an overcurrent state occurs) for some reason, the overvoltage-protection circuit 12 cuts off the current input from the DC power source 2 or 3 so that this current is not output to the control circuit portion 14 via the DC output terminal 13, in order to prevent the components in the control circuit 14 from being broken.

Figure 2:
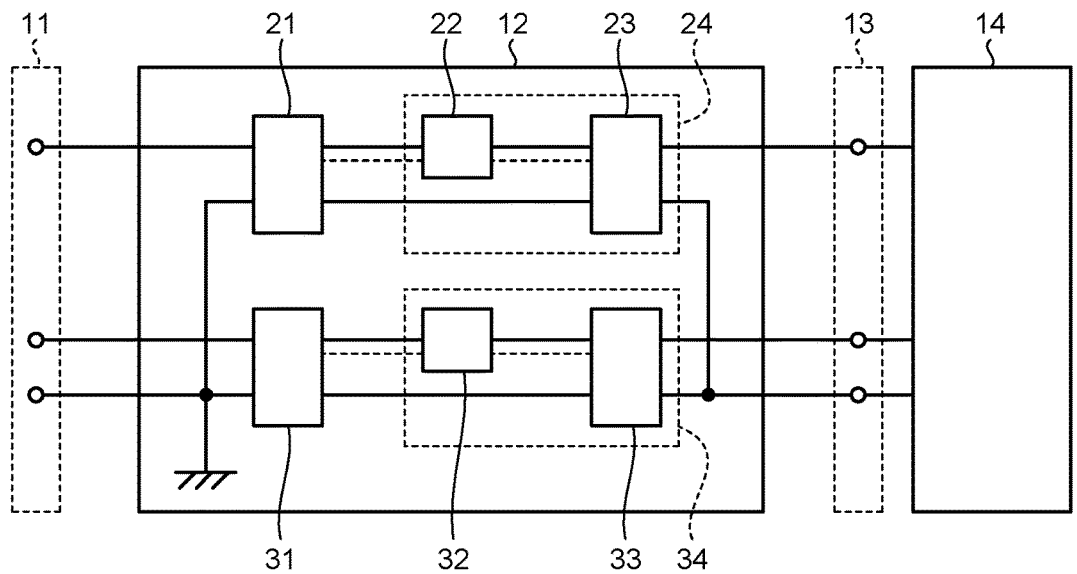
FIG. 2 is a block diagram illustrating an overvoltage-protection circuit portion according to the present embodiment.

FIG. 2 is a block diagram illustrating the overvoltage-protection circuit 12 according to the present embodiment. The overvoltage-protection circuit 12 includes first current cut-off units 21 and 31, and second current cut-off units 24 and 34 that are respectively provided at subsequent stages of the first current cut-off units 21 and 31. The second current cut-off unit 24 includes a first switch 22 and a second switch 23. The second current cut-off unit 34 includes a first switch 32 and a second switch 33. In the present embodiment, the first current cut-off unit 31 has the same circuit configuration as the first current cut-off unit 21, and the first switch 32 and the second switch 33 constituting the second current cut-off unit 34 respectively have the same circuit configurations as the first switch 22 and the second switch 23 constituting the second current cut-off unit 24. However, the first current cut-off unit 31 and the second current cut-off unit 34 may have other circuit configurations that exert the same functions as the first current cut-off unit 21 and the second current cut-off unit 24, respectively.

A function of the first current cut-off unit 21 and functions of the first switch 22 and the second switch 23 constituting the second current cut-off unit 24 will be described next. Functions of the first current cut-off unit 31 and the second current cut-off unit 34 are the same as or equivalent to those of the first current cut-off unit 21 and the second current cut-off unit 24, respectively, and therefore the descriptions thereof will be omitted.

The first current cut-off unit 21 has a function of cutting off the current input from the power-supply-voltage input terminal 11 so that said current does not flow into the first switch 22 and the subsequent circuits, in a case where the current input from the power-supply-voltage input terminal 11 exceeds a preset threshold (for example, in a case where the overcurrent state occurs) for some reason.

The first switch 22 is turned on when a voltage value of the voltage applied from the power-supply-voltage input terminal 11 exceeds a preset threshold, and is turned off when the voltage value is lower than the threshold.

The second switch 23 is connected between the first switch 22 and the DC output terminal 13. When the voltage value of the voltage applied from the power-supply-voltage input terminal 11 is lower than the preset threshold, the first switch 22 is turned off as described before, so that the second switch 23 is turned on. Consequently, a DC voltage is output from the DC output terminal 13 to the control circuit 14.

Meanwhile, when the voltage value of the voltage applied from the power-supply-voltage input terminal 11 exceeds the preset threshold (for example, when the overvoltage state occurs) for some reason, the first switch 22 is turned on as described before, so that the second switch 23 is turned off. Consequently, no DC voltage is output from the DC output terminal 13 to the control circuit 14.

Figure 3:
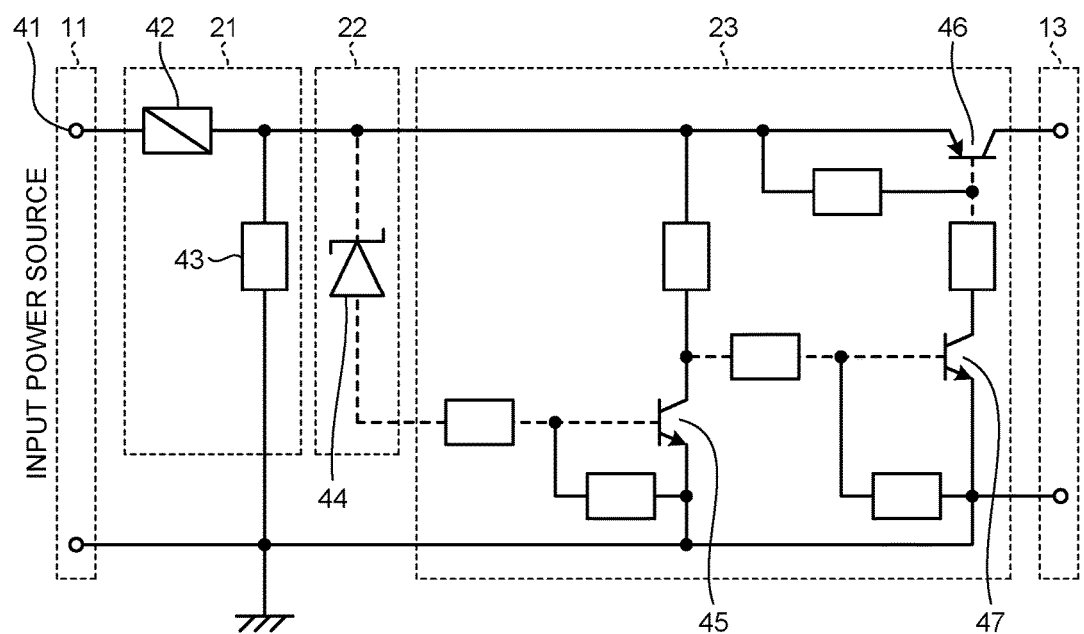
FIG. 3 is a diagram illustrating a configuration example of the overvoltage-protection circuit portion illustrated in FIG. 2.

FIG. 3 is a diagram illustrating a configuration example of the overvoltage-protection circuit 12 illustrated in FIG. 2, and illustrates an example of circuit configurations of the first current cut-off unit 21, the first switch 22, and the second switch 23 of the overvoltage-protection circuit 12.

A current cut-off element 42 in the first current cut-off unit 21 is connected to a positive terminal 41 of the power-supply-voltage input terminal at one end and is connected to an input end of the first switch 22 at the other end. That is, the current cut-off element 42 is provided on a current path between the power-supply-voltage input terminal 11 and the DC output terminal 13. For example, a fuse is used as the current cut-off element 42. When a current value of a current flowing through the fuse exceeds a preset threshold, an overcurrent flows through the fuse to cause melting of the fuse, so that the current is cut off not to flow into the first switch 22 and the subsequent circuits.

A resistor 43 in the first current cut-off unit 21 is connected to the other end of the current cut-off element 42 at one end and is grounded at the other end. The resistor 43 functions so as to draw the current that has passed through the current cut-off element 42 into the ground.

During a period in which a voltage is applied from the power-supply-voltage input terminal 11, a current always flows through the resistor 43 that is connected to the current cut-off element 42 at one end and is grounded at the other end. The threshold determining the current value at which the current cut-off element 42 cuts off the current is designed to be a larger value than a current flowing through the resistor 43 in a case where the voltage value of the voltage applied from the power-supply-voltage input terminal 11 is lower than the preset threshold.

Therefore, in a case where the voltage value of the voltage applied from the power-supply-voltage input terminal 11 is lower than said threshold, the current is not cut off by the current cut-off element 42.

A Zener diode 44 is used as the first switch 22, for example. In a case where the voltage value of the voltage applied from the power-supply-voltage input terminal 11 is lower than the preset threshold, the Zener diode 44 does not become electrically conductive. Therefore, a first transistor 45 in the second switch 23 remains off. At this state, a base current is supplied from the power-supply-voltage input terminal 11 to a base of a second transistor 47 in the second switch 23, so that the second transistor 47 is turned on. When the second transistor 47 is turned on, a base current of a third transistor 46 in the second switch 23 flows as a collector current of the third transistor 46 itself, so that the third transistor 46 is turned on. In this manner, the voltage applied from the power-supply-voltage input terminal 11 is output from the DC output terminal 13 to the control circuit 14.

Meanwhile, in a case where the voltage applied from the power-supply-voltage input terminal 11 exceeds the preset threshold (in a case where the overvoltage state occurs), that is, exceeds a voltage the control circuit should be protected, the Zener diode 44 becomes electrically conductive. When the Zener diode 44 becomes electrically conductive, a base current of the first transistor 45 in the second switch 23 flows and therefore the first transistor 45 is turned on. When the first transistor 45 is turned on, a voltage between base and emitter of the second transistor 47 in the second switch 23 does not rise. Therefore, the base current of the second transistor 47 does not flow, and the second transistor 47 is turned off. Consequently, the base current of the third transistor 46 stops flowing, and therefore the third transistor 46 is also turned off. As a result, no voltage is output from the DC output terminal 13 to the control circuit 14. This means that an overvoltage protection function by the overvoltage-protection circuit 12 is achieved. That is, the control circuit 14 of the robot control device is protected from the overvoltage state by the overvoltage-protection circuit 12 that functions as a protection circuit of the robot control device according to the present embodiment.

The above operation is an operation performed when a failure of the Zener diode 44 does not occur. An operation performed when the Zener diode 44 fails, more specifically, operations performed when the Zener diode 44 fails in an open state and in a short-circuited state will be described next.

First, in a state where the Zener diode 44 fails in the open state, when the voltage applied from the power-supply-voltage input terminal 11 rises to become the overvoltage state and exceeds the preset threshold, the current flowing through the resistor 43 increases in accordance with the Ohm's law. When said current value exceeds the preset threshold, that is, a melting current of the current cut-off element 42, the current flowing through the current cut-off element 42 is cut off by the current cut-off element 42 itself. Consequently, no voltage is output from the DC output terminal 13 to the control circuit 14 irrespective of whether the third transistor 46 that is a main transistor is on or off. This means that the overvoltage protection function by the overvoltage-protection circuit 12 is achieved. That is, the control circuit 14 of the robot control device is protected from the overvoltage state by the overvoltage-protection circuit 12 that operates as the protection circuit of the robot control device according to the present embodiment.

In a case where the Zener diode 44 fails in the short-circuited state, the second switch 23 functions in the same manner as that in a case where the voltage value applied from the power-supply-voltage input terminal 11 exceeds the preset threshold (in a case where the overvoltage state occurs). Therefore, in a state where the Zener diode 44 fails in the short-circuited state, no voltage is output from the DC output terminal 13 to the control circuit 14 irrespective of whether the voltage applied from the power-supply-voltage input terminal 11 is lower than or exceeds the threshold.

Accordingly, in a case where the voltage applied from the power-supply-voltage input terminal 11 exceeds the preset threshold (in a case where the overvoltage state occurs), no voltage is output from the DC output terminal 13 to the control circuit 14, irrespective of whether the first switch 22, that is, the Zener diode 44 fails in the open state or fails in the short-circuited state. Therefore, the control circuit 14 is protected from an overvoltage, so that the safety of the robot control device can be enhanced more.

As described above, the protection circuit of the robot control device according to the present embodiment includes: the first current cut-off unit that cuts off the current input from the power-supply-voltage input terminal connected to an external power source in a case where the current value of this current exceeds a preset threshold; and the second current cut-off unit that cuts off the current output from the first current cut-off unit in a case where the voltage value of the voltage applied from the power-supply-voltage input terminal exceeds a preset threshold. The first current cut-off unit includes: the current cut-off element provided on the current path between the power-supply-voltage input terminal and the DC output terminal; and the resistor that draws the current having passed through the current cut-off element into the ground. Therefore, even in a case of using a power-supply product with no safety certification acquired from a third party, it is possible to achieve the protection circuit of the robot control device in which a sufficient level of safety in compliance with the safety certification is ensured.

When the first switch fails in the open state and the voltage value applied from the power-supply-voltage input terminal exceeds the preset threshold, the resistance value of the resistor 43 is preferably set to a resistance value that causes a current that is sufficient for the current cut-off element to cut off the current input from the power-supply-voltage input terminal to flow through the current cut-off element. The resistance value of the resistor 43 is preferably set to a resistance value that causes the current cut-off element not to cut off the current in a case where the voltage value applied from the power-supply-voltage input terminal is the preset threshold or lower. Above described setting of the resistance values enables the protection circuit of the robot control device to be achieved with a simple circuit configuration.

The configuration described in the above embodiment is only an example of the configurations of the present invention. The configuration can be combined with other publicly-known techniques, and it is needless to mention that the present invention can be configured while modifying it without departing from the scope of the invention, such as omitting a part of the configuration.

INDUSTRIAL APPLICABILITY

As described above, the present invention is useful as a protection circuit for a robot control device that ensures a sufficient level of safety for achieving compliance with safety certification and that has a minimum necessary circuit configuration.

REFERENCE SIGNS LIST

1 AC power source, 2 DC power source, 4 control device, 5 robot, 11 power-supply-voltage input terminal, 12 overvoltage-protection circuit portion, 13 DC output terminal, 14 control circuit portion, 21,31 first current cut-off unit, 24,34 second current cut-off unit, 22,32 first switch, 23,33 second switch, 41 positive terminal, 42 current cut-off element, 44 Zener diode, 45 first transistor, 46 third transistor, 47 second transistor.

The invention claimed is:

1. A protection circuit for a robot control device, the protection circuit comprising:
   a power-supply-voltage input terminal connected to an external power source;
   a first current cut-off unit that is connected to the power-supply-voltage input terminal and that cuts off a current input from the power-supply-voltage input terminal when a current value of the current exceeds a preset threshold;
   a second current cut-off unit that is provided at a subsequent stage of the first current cut-off unit and that cuts off a current output from the first current cut-off unit when a voltage value of a voltage applied from the power-supply-voltage input terminal exceeds a preset threshold; and
   a DC output terminal to which a DC current is output from the second current cut-off unit toward an object to be driven, wherein
   the second current cut-off unit includes:
      a first switch that is turned on when the voltage value applied from the power-supply-voltage input terminal exceeds the preset threshold; and
      a second switch that is provided at a subsequent stage of the first switch and that is turned off to cut off a current output from the DC output terminal when the first switch is turned on,
   wherein the second switch includes:
      a first transistor that is connected to the first switch and is controlled by the first switch to be turned on or turned off; and
      a second transistor that is connected to a collector terminal of the first transistor and is controlled by the first transistor to be turned on or turned off, wherein
   the second switch has a circuit configuration in which the second transistor is turned off in response to the first transistor being turned on.

2. The protection circuit for the robot control device according to claim 1, wherein
   the first current cut-off unit includes:
      a current cut-off element provided on a current path between the power-supply-voltage input terminal and the DC output terminal; and
      a resistor that draws a current having passed through the current cut-off element into a ground.

3. The protection circuit for the robot control device according to claim 2, wherein the current cut-off element cuts off a current flowing therethrough to cut off a current output from the DC output terminal when a current flowing through the first current cut-off unit exceeds a preset threshold.

4. The protection circuit for the robot control device according to claim 1, wherein
   the second switch further includes:
   a third transistor that is connected to a collector terminal of the second transistor and is controlled by the second transistor to be turned on or off, and wherein
   the second switch has a circuit configuration in which:
      the first transistor is turned on when the first switch is turned on; and
      the third transistor is turned off as the second transistor is turned off, and a DC current output from the DC output terminal is turned off.

5. A protection circuit for a robot control device, the protection circuit comprising:
   a power-supply-voltage input terminal connected to an external power source;
   a first current cut-off unit that is connected to the power-supply-voltage input terminal and that cuts off a current input from the power-supply-voltage input terminal when a current value of the current exceeds a preset threshold;
   a second current cut-off unit that is provided at a subsequent stage of the first current cut-off unit and that cuts off a current output from the first current cut-off unit when a voltage value of a voltage applied from the power-supply-voltage input terminal exceeds a preset threshold; and
   a DC output terminal to which a DC current is output from the second current cut-off unit, wherein
   the second current cut-off unit includes:
      a first switch that is turned on when the voltage value applied from the power-supply-voltage input terminal exceeds the preset threshold; and
      a second switch that is provided at a subsequent stage of the first switch and that is turned off to cut off a current output from the DC output terminal when the first switch is turned on,
   wherein the first current cut-off unit includes:
      a current cut-off element provided on a current path between the power-supply-voltage input terminal and the DC output terminal; and
      a resistor that draws a current having passed through the current cut-off element into a ground,
   wherein the resistor is set to have a resistance value that:
      causes a current sufficient for the current cut-off element to cut off the current input from the power-supply-voltage input terminal to flow through the current cut-off element when the first switch fails in an open state and the voltage value applied from the power-supply-voltage input terminal exceeds the preset threshold; and
      causes the current cut-off element not to cut off the current when the voltage value applied from the power-supply-voltage input terminal is equal to or lower than the present threshold.

6. A protection circuit for a robot control device, the protection circuit comprising:
   a power-supply-voltage input terminal connected to an external power source;
   a first current cut-off unit that is connected to the power-supply-voltage input terminal and that cuts off a current input from the power-supply-voltage input terminal when a current value of the current exceeds a preset threshold;
   a second current cut-off unit that is provided at a subsequent stage of the first current cut-off unit and that cuts off a current output from the first current cut-off unit when a voltage value of a voltage applied from the power-supply-voltage input terminal exceeds a preset threshold; and
   a DC output terminal to which a DC current is output from the second current cut-off unit, wherein
   the first current cut-off unit includes:
      a current cut-off element provided on a current path between the power-supply-voltage input terminal and the DC output terminal; and
      a resistor that draws a current having passed through the current cut-off element into a ground,
   wherein the second current cut-off unit includes:

a first switch that is turned on when the voltage value applied from the power-supply-voltage input terminal exceeds the preset threshold, wherein the resistor is set to have a resistance value that:

causes a current sufficient for the current cut-off element to cut off the current input from the power-supply-voltage input terminal to flow through the current cut-off element when the first switch fails in an open state and the voltage value applied from the power-supply-voltage input terminal exceeds the preset threshold; and causes the current cut-off element not to cut off the current when the voltage value applied from the power-supply-voltage input terminal is equal to or lower than the present threshold.

7. The protection circuit for the robot control device according to claim 6, wherein the second current cut-off unit includes a second switch that is provided at a subsequent stage of the first switch and that is turned off to cut off a current output from the DC output terminal when the first switch is turned on.

8. The protection circuit for the robot control device according to claim 6, wherein the current cut-off element cuts off a current flowing therethrough to cut off a current output from the DC output terminal when a current flowing through the first current cut-off unit exceeds a preset threshold.

9. The protection circuit for the robot control device according to claim 7, wherein the second switch includes:

a first transistor that is connected to the first switch and is controlled by the first switch to be turned on or turned off;

a second transistor that is connected to a collector terminal of the first transistor and is controlled by the first transistor to be turned on or turned off; and a third transistor that is connected to a collector terminal of the second transistor and is controlled by the second transistor to be turned on or off, and wherein the second switch has a circuit configuration in which:

the first transistor is turned on when the first switch is turned on;

the second transistor is turned off as the first transistor is turned on; and the third transistor is turned off as the second transistor is turned off, and a DC current output from the DC output terminal is turned off.

* * * * *